(12) United States Patent
Frantz

(10) Patent No.: US 7,104,219 B2
(45) Date of Patent: Sep. 12, 2006

(54) PILING DECONTAMINATION AND MARINE LIFE ENHANCEMENT SYSTEM

(76) Inventor: Anthony F. Frantz, 1037 Wild Coyote Rd., Freeland, WA (US) 98249

( * ) Notice: Subject to any disclaimer, the term of this patent is extended or adjusted under 35 U.S.C. 154(b) by 105 days.

(21) Appl. No.: 10/449,815

(22) Filed: May 30, 2003

(65) Prior Publication Data

US 2004/0240945 A1    Dec. 2, 2004

Related U.S. Application Data

(60) Provisional application No. 60/385,937, filed on Jun. 4, 2002.

(51) Int. Cl.
*A01K 61/00* (2006.01)
*E02D 5/60* (2006.01)

(52) U.S. Cl. .................. 119/221; 405/216; 119/207

(58) Field of Classification Search ............. 119/223, 119/237–239, 207, 208, 215, 221, 201, 235, 119/238, 243; 405/4, 195.1, 211, 211.1, 405/216
See application file for complete search history.

(56) References Cited

U.S. PATENT DOCUMENTS

| | | | | |
|---|---|---|---|---|
| 1,815,521 A | * | 7/1931 | Shinsho | 119/238 |
| 2,319,170 A | * | 5/1943 | Royal | 119/238 |
| 3,181,300 A | | 5/1965 | Plummer | 61/54 |
| 3,601,999 A | | 8/1971 | Olsen | 61/46 |
| 3,719,049 A | | 3/1973 | Shaw et al. | 61/54 |
| 3,741,159 A | * | 6/1973 | Halaunbrenner | 119/240 |
| 3,996,894 A | * | 12/1976 | Wiegardt, Jr. | 119/237 |
| 3,999,399 A | | 12/1976 | Maurer | 61/54 |
| 4,182,270 A | * | 1/1980 | Fourcher | 119/238 |
| 4,212,268 A | * | 7/1980 | Chapman | 119/210 |
| 4,244,156 A | * | 1/1981 | Watts, Jr. | 405/211 |
| 4,317,429 A | * | 3/1982 | Leighton et al. | 119/241 |
| 4,395,970 A | * | 8/1983 | Kunkle et al. | 119/240 |
| 4,439,071 A | | 3/1984 | Roper, Jr. | 405/216 |
| 4,445,806 A | | 5/1984 | Crain | 405/216 |
| 4,468,885 A | * | 9/1984 | Mandish | 119/207 |
| 4,744,331 A | * | 5/1988 | Whiffin | 119/223 |
| 4,854,774 A | * | 8/1989 | Streichenberger | 405/25 |
| 5,380,131 A | * | 1/1995 | Crawford | 405/216 |
| 5,435,667 A | | 7/1995 | Strange | 405/216 |
| 5,628,280 A | * | 5/1997 | Ericsson | 119/239 |
| 5,653,193 A | * | 8/1997 | Marissal | 119/240 |
| 5,839,391 A | * | 11/1998 | Shaar | 119/212 |
| 5,919,004 A | | 7/1999 | Christenson | 405/216 |
| 6,089,191 A | * | 7/2000 | Calinski et al. | 119/221 |
| 6,119,630 A | * | 9/2000 | Lobsiger et al. | 119/238 |

(Continued)

FOREIGN PATENT DOCUMENTS

DE    4212268 A1 * 11/1992

*Primary Examiner*—Robert P. Swiatek
*Assistant Examiner*—Elizabeth Shaw
(74) *Attorney, Agent, or Firm*—Seed IP Law Group PLLC

(57) ABSTRACT

A marine habitat enhancement system is provided that in one embodiment is configured for attachment to existing pilings and in another embodiment is a stand-alone system anchored to the soil. The system includes a housing formed of a plurality of panels configured for attachment together to surround either a piling or a marine habitat. Compartments on the exterior of the housing can be used to promote the growth of plants and other marine aquaculture. A cap is provided for use with stand-alone pilings to prevent contaminated water and material from escaping outside the sleeve formed by the plurality of panels.

20 Claims, 9 Drawing Sheets

U.S. PATENT DOCUMENTS

| | | |
|---|---|---|
| 6,167,831 B1 * | 1/2001 | Watt et al. .................. 114/322 |
| 6,230,646 B1 * | 5/2001 | Berry et al. ................ 114/293 |
| 6,520,116 B1 * | 2/2003 | Jefferds ...................... 119/238 |
| 6,578,523 B1 * | 6/2003 | Gagnon ...................... 119/234 |
| 2002/0094239 A1 * | 7/2002 | Bradley et al. ............. 405/216 |
| 2004/0013473 A1 * | 1/2004 | Gibson ....................... 405/211 |
| 2004/0240943 A1 * | 12/2004 | Brensinger .................. 405/211 |
| 2005/0002741 A1 * | 1/2005 | Brensinger et al. ......... 405/231 |

* cited by examiner

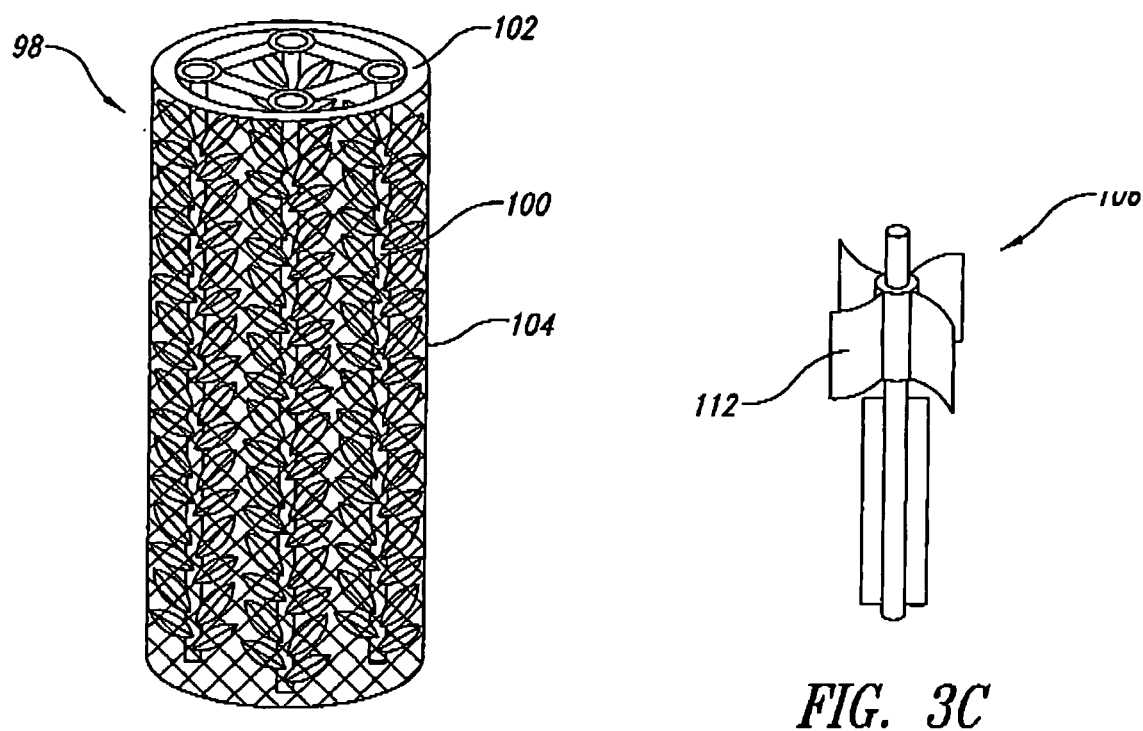
*FIG. 3B*
*FIG. 3C*
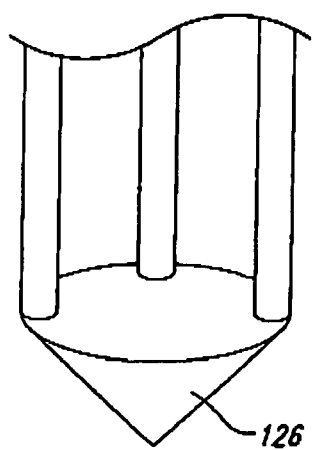
*FIG. 3D*
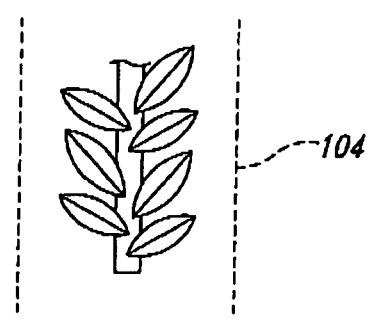
*FIG. 3E*

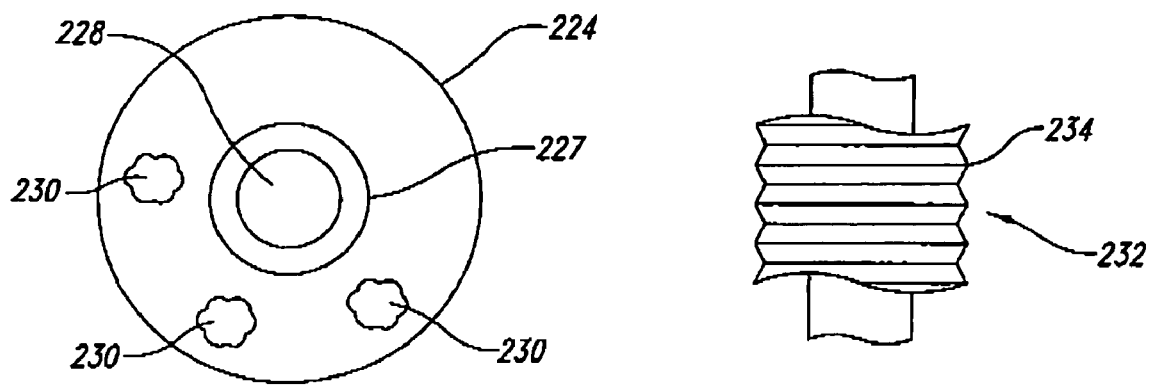
*FIG. 9*
*FIG. 10*
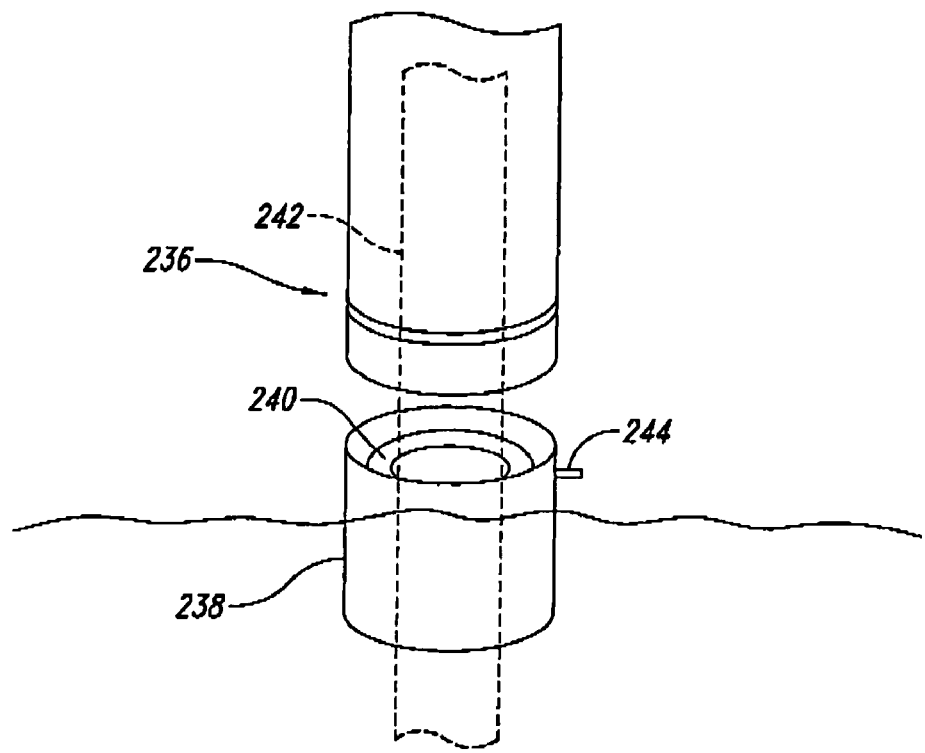
*FIG. 11*

PILING DECONTAMINATION AND MARINE LIFE ENHANCEMENT SYSTEM

BACKGROUND OF THE INVENTION

1. Field of the Invention

The present invention is directed to a system and method for protecting marine life from contaminated pilings, and, more particularly, to a marine aquaculture recovery system that contains and decontaminates pilings and provides a habitat to facilitate the recovery of marine aquaculture in the contaminated area.

2. Description of the Related Art

Pilings and similar support structures, such as fence posts, telephone poles, and light poles, are frequently treated with a preservative to resist corrosion and decay when placed in the soil. In the past, creosote has been one preservative used to protect wood. It has been discovered that creosote and other preservatives can be damaging to the environment and harmful to nearby life.

More particularly, creosote can seep into the soil surrounding the posts and pilings and pollute the soil, causing damage to plants growing nearby and endangering animal and human life, as well as endangering aquatic life in the case of pilings. For example, barnacles, mussels, and similar aquatic life can attach themselves to creosote-treated pilings, becoming themselves contaminated. Examples of such aquatic life include pile worm, *Nereis procera*, an active predator that inhabits pilings, mussel beds, eel grass flats, plumed tube worm, *Magalomma vesiculatum*, oius tubes, white plumed anenome, *Metridium senile*, which attaches to rocks and pilings at the lowest intertidal level to very deep water, scarlet anenome, *Tealia lofotensis*, which attaches to rocks or pilings at low tides in semi-protected areas, wood bryozoan, *Bugula neritina*, which is found attached to wood pilings, edible mussel, blue and bay mussel *Mytilus edulis*, dead man's fingers, *Polymastis pachymastia*, which is a sponge that attaches to rocks or pilings, warty sea squirt, *Pyuria haustor* and a variety of algae that also attach to pilings. This marine life feeding on contaminated material become contaminated and will in turn spread the contamination to other marine life. Hence, there is a need to protect all forms of life from aging posts and pilings and to provide a system that enhances the recovery of animal and plant life in contaminated areas.

While a number of devices have been proposed for enclosing pilings, such devices fail to adequately protect surrounding aquatic life and to promote the recovery and healthy growth of such life.

For example, U.S. Pat. No. 3,181,300, discloses a piling jacket that uses a multi-piece fabric jacket fastened together with a zipper or similar system that is snugly secured against the piling. The jacket provides no space for injecting decontamination material between the jacket and the piling, and the jacket does not cover the top of the piling, upon which birds and other marine and aquatic life can build habitat.

U.S. Pat. No. 4,439,071 discloses a piling encasement system in which molds, having two hemispherical parts, are used to encompass a piling. An annular space between the mold and the piling is filled with concrete that is injected to form a concrete sleeve around the piling. There is no teaching of decontaminating the piling or of providing materials to enhance the growth of aquatic life.

U.S. Pat. No. 5,919,004 teaches a method and apparatus for protective encapsulation of structural members that is in the form of a tubular jacket installed around a submerged pile. The objective of this patent and the other patents referred to therein is to form a stagnant film or layer of water between the wrapping and the piling to deny marine microorganisms or micro-borers of necessary oxygen, thus causing the death of the marine microorganism or marine borer and preserving the life of the piling. An aperture is formed in a tubular jacket around the piling through which foam is injected to fill the annular space therebetween. The foam is allowed to set, which provides life extending benefit to the piling. Here, the goal is to destroy marine life in order to preserve the life of the piling.

BRIEF SUMMARY OF THE INVENTION

The disclosed embodiments of the invention are directed to a marine aquaculture recovery system that includes a sleeve for containing and decontaminating a piling and a habitat for promoting the recovery and growth of marine aquaculture and other life forms in and around the contaminated area.

In accordance with one embodiment of the invention, a single piece casing or multi-part casing is provided that is sized and shaped to enclose the piling while leaving an annular space between the piling and the casing. The casing is then installed around the piling and approximately 12 inches or more into the soil. For dock pilings where the tops are covered, the casing is formed into longitudinal halves or panels. The panels can be taken off other fixed structures that are healthy and added to the casing or sleeve. A seal at the bottom of the casing contacts the piling to prevent further leaching of hazardous material into the surrounding soil and air or water. Ideally, sand is used to fill in the annular space between the casing and the piling. The sand can be treated with decontaminant. A marine aquaculture recovery device is then installed on or in association with the casing and the piling or in an area close to the casing and the piling.

In accordance with another embodiment of the invention, the marine aquaculture recovery device includes at least one frayed rope stretched on a frame that is installed in a housing and anchored to the sea floor. The frayed polyrope becomes an attachment point for marine life, such as mussels. Alternatively, marine life may be grown on the frayed polyrope prior to installation. The anchor can be in the form of a solid rock or cement with a rock-encrusted surface. The material at the base of the piling that holds plants can also be used under a buoy for a larger area to be planted.

In accordance with another aspect of the foregoing embodiment of the invention, a weight used to hold the habitat to the floor of the body of water is formed to include compartments or trays for seeds, plants, or other aquatic life to promote the recovery of marine aquaculture. Ideally, flotation is provided within the housing to hold the stretched rope above the floor of the body of water. In addition, a solar panel, battery, or other source of power may be used in conjunction with a device for monitoring temperature, current flow, nutrients, etc. or to power a navigation light.

In accordance with another embodiment of the invention, a cap or collar is placed around the top of the piling casing to prevent the overflow of water and contaminants and to deny access to aquatic life.

In accordance with yet another embodiment of invention, a piling sleeve is provided for encircling and enclosing a piling and for providing a circumscribing space that is filled with decontaminant, such as sand, and an aquaculture habitat is attached to or integrally formed with the sleeve.

In accordance with another aspect of the foregoing embodiment, the sleeve comprises removable panels having a marine habitat enhancement system in conjunction therewith that can include one or more of a habitat housing and food for different species, which can be grown at a clean location, following which the panels are removed and placed around a contaminated piling, with a void between the contaminated piling and the sleeve filled with a decontaminant, sand, or the like, to protect the existing marine life on the panels and to contain the contaminant.

In accordance with another aspect of the invention, a marine artificial attachment aquaculture recovery system is provided that can be used for permanent or temporary enhancements of marine aquaculture. The system includes a habitat protected by removable casings and, in one embodiment, configured to be anchored permanently or temporarily to the floor of the body of water. Protective mesh netting surrounds a frayed rope or other similar habitat enhancement device that is suspended within the casing. An air pump provides air, and trays, cups, and the like may be formed thereon for holding seeds, plant life, or other aquaculture on the interior or exterior of the casing. Solar panels or batteries may be used to provide electricity to operate the air pump, navigational lights, and even a remote TV camera or other communication device to provide data regarding the status or condition of the system to a remote receiver.

BRIEF DESCRIPTION OF THE SEVERAL VIEWS OF THE DRAWING(S)

The foregoing and other features and advantages of the disclosed embodiments of the invention will become more readily understood from the following detailed description when taken in conjunction with the accompanying drawings, wherein:

FIGS. 3A–3E illustrate an artificial marine attachment aquaculture recovery system formed in accordance with the present invention;

FIG. 9 illustrates an independent bottom for use with a sleeve of the present invention;

FIG. 10 illustrates a ribbed sleeve configuration; and

FIG. 11 illustrates separable sleeve components.

DETAILED DESCRIPTION OF THE INVENTION

Figure 1A:
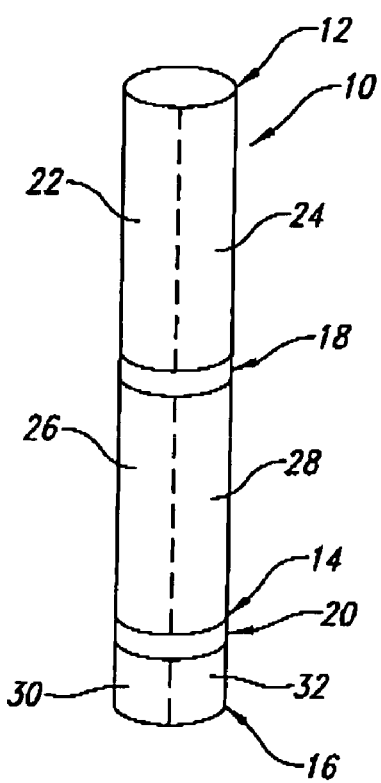
FIGS. 1A–1C illustrate one embodiment of a piling containment sleeve formed in accordance with the present invention.

Referring initially to FIG. 1A, shown therein is a sleeve 10 comprising a top section 12, middle section 14, and a bottom section 16. The top and middle sections, 12, 14 are coupled together at a connector section 18. The middle section 14 is coupled to the bottom section 16 at an inflatable bladder 20. The top section 12 is divided longitudinally into a first top half 22 and second top half 24. Similarly, the middle section 14 is divided longitudinally into a first middle half 26 and second middle half 28, and the bottom section 16 is divided longitudinally into a first bottom half 30 and second bottom half 32.

The sleeve 10 may be placed over an existing piling as a single unit, as shown in FIG. 1A, or, if the piling is not accessible from the top, each of the top, middle, and bottom sections 12, 14, and 16 can be disassembled into longitudinal first and second top halves 22, 24, first and second middle halves 26, 28, and first and second bottom halves 30, 32, respectively, for attachment to the sides of the piling.

The inflatable bladder 20 may be formed of compliant material, such as rubber or its equivalent, and have a hollow interior that is selectively inflated and deflated with a fluid, such as air or water. When inflated, the bladder 20 is sized and shaped to bear against a piling (not shown) in order to prevent contaminants from leaking downward. The bottom section 32 is of a sufficient length to enable the sleeve to be driven at least 12 inches into the soil.

Figure 1B:
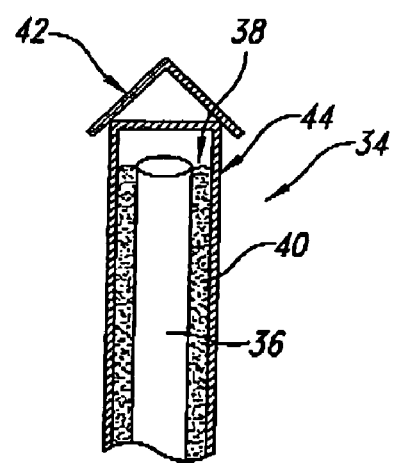

In FIG. 1B is shown a sleeve system 34 having a sleeve 44 surrounding a piling or post 36. Decontaminant material, such as sand 40, fills the space 38 between the piling or post 36 and the sleeve 44. A cap 42 is placed on the sleeve 44 to entirely cover the interior space 38. The cap 42 thus prevents escape of contaminated material from within the sleeve 44 and prevents the introduction of marine life and other life forms into the sleeve 44. Exhaust holes may be formed in the cap 42 to facilitate bioremediation.

Figure 1C:
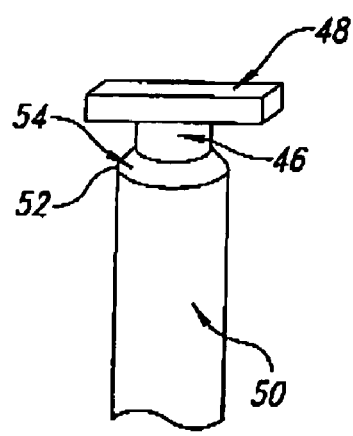

When the piling or post is covered by a deck or other structure, it is not feasible to use the cap 42. Thus, as shown in FIG. 1C, a piling 46, which supports a deck 48, is enclosed within a sleeve 50. The top 52 of the sleeve 50 is closed with an annular collar 54 that encircles the piling 46. As with the other embodiment in FIG. 1B, the collar 54 prevents overflowing of water and contaminants above the top 52 of the sleeve 50 and keeps marine life outside the sleeve 50.

The foregoing embodiments provide a sleeve that keeps marine life away from the contaminants surrounding the piling, and the area between the piling and the sleeve is filled with sand for capturing the dead marine life and to keep the piling sleeve from moving. A cap slips over or around the piling to completely seal the piling. The various sections can be detached from one another for portability. Various means of connecting the sections together can be used, including male-female coupling, bolts, or other known attachment methods that will not be described in detail herein because they are readily commercially available.

In use, the sleeve is placed over or assembled around the piling and driven to at least within a foot below the bottom of the soil. The bladder 20 is inflated to bear against the piling, and then the space between the sleeve and the piling is filled with a decontaminant or with sand, or both, to maintain stability and to contain the toxins.

Figure 2:
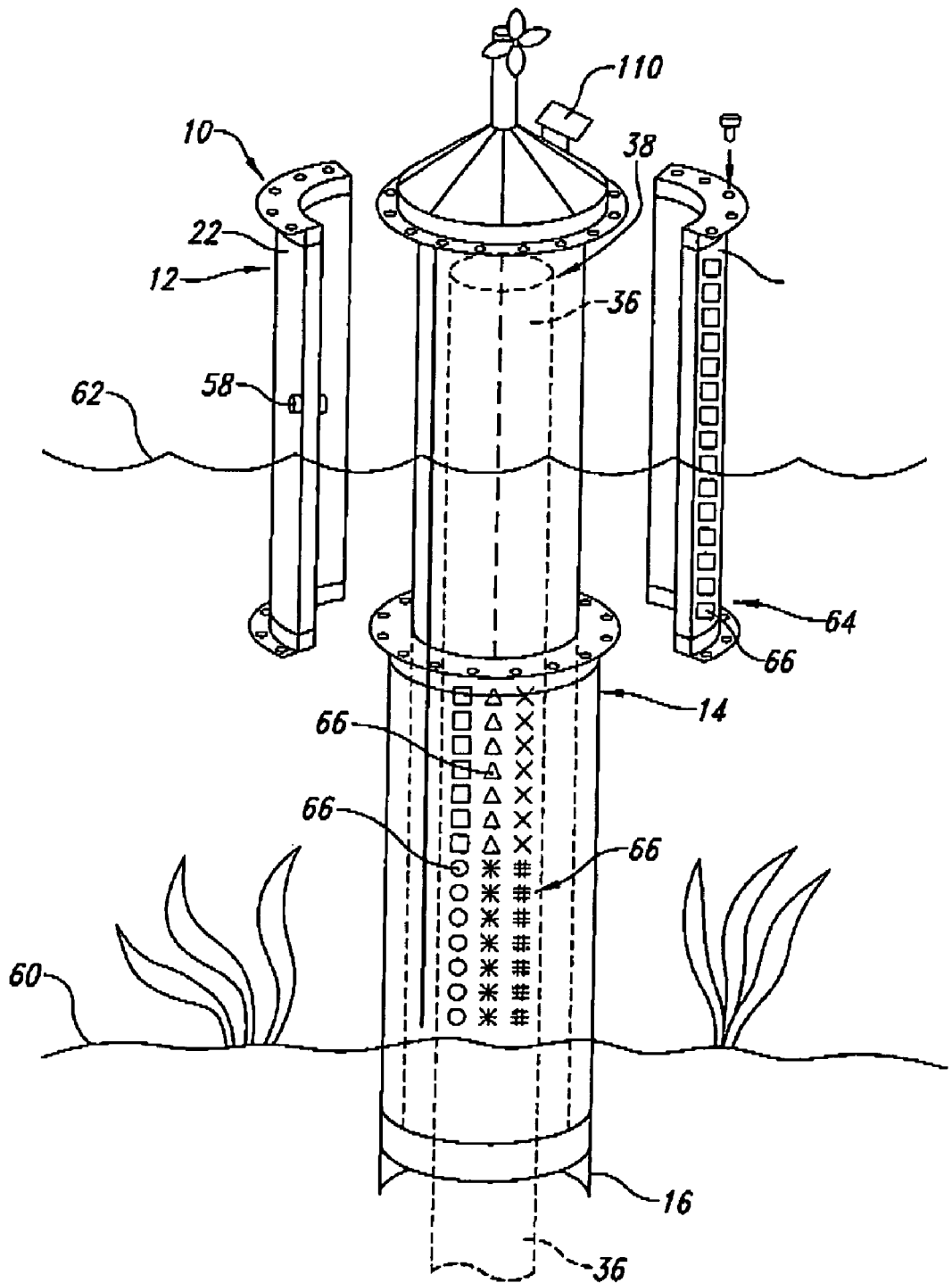
FIG. 2 illustrates a piling containment sleeve with marine recovery system associated therewith in accordance with the present invention.
Figure 3A:
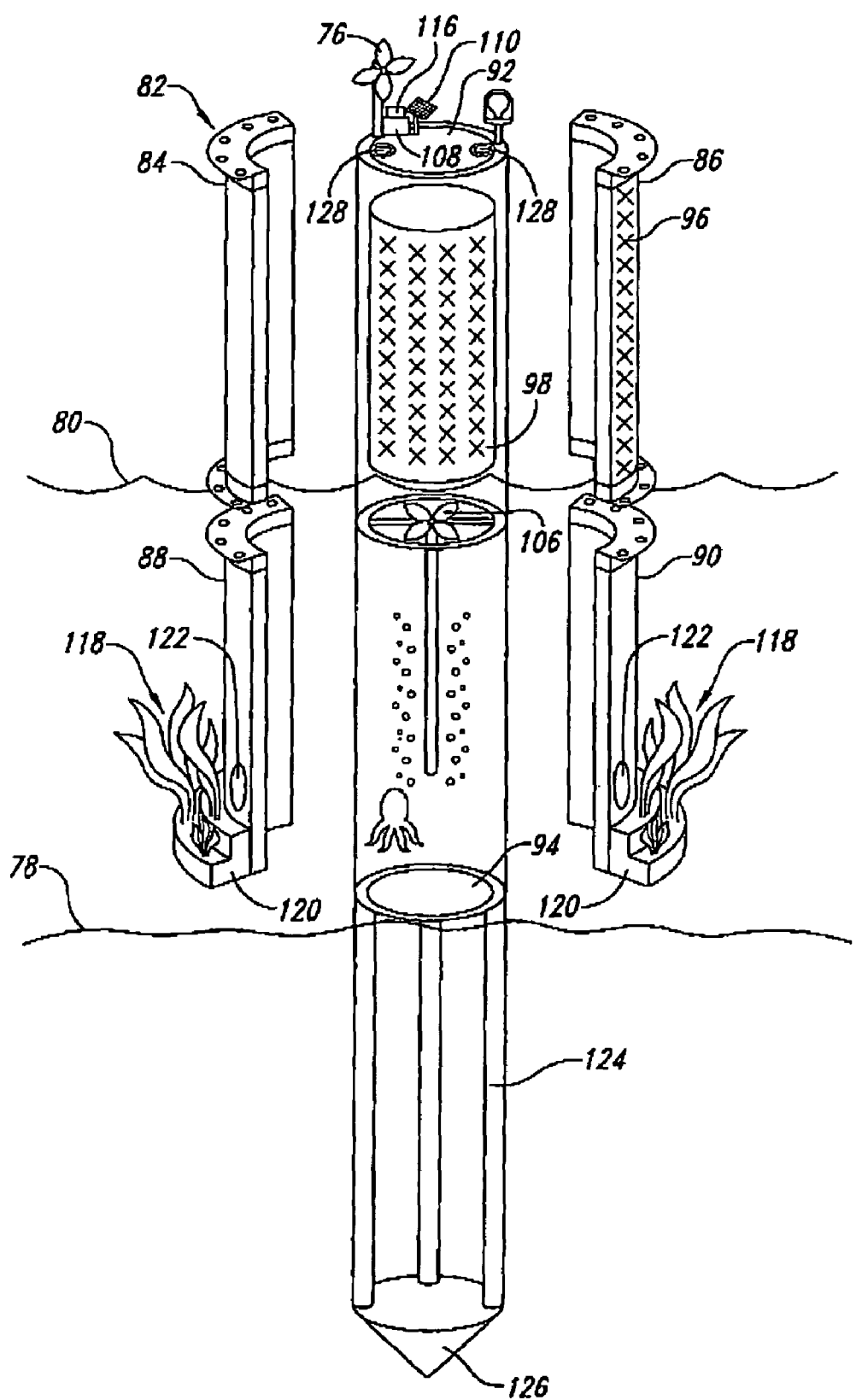

In another embodiment of the invention, a habitat sleeve system 56 is provided, as shown in FIG. 2. Identical components with the sleeve 10 shown in FIG. 1A are identified with the same reference numbers in FIG. 2. More particularly, the sleeve system 56 utilizes bolts 58 to attach the first and second top halves 22, 24 together. In addition, the top section 12 bolts directly to the middle section 14 with bolts 58, as shown. The bladder 20 couples the middle section 14 to the bottom section 16, which is driven below the floor 60 of the body of water 62 by approximately 24 inches, which depends on soil conditions. The depth can be deeper for additional support, and the bottom section 16, or an upper middle section, depending on height, can be stronger or thicker as needed to withstand the driving forces. Attached to the outside of the top section 12 and middle section 14 is a marine habitat enhancement system 64 that includes a plurality of habitat housings 66, denoted in the figure with various symbols and geometric shapes representing the different housing and feeding requirements for the different species and water depths. By attaching the system 64 to the exterior of the top and middle sections 12, 24, the system 64 is protected from the contaminants associated with the piling 36, and the section halves 22, 24, 26, 28, 30, and 32 may be removed and relocated to other areas to reintroduce marine life.

Also shown in FIG. 2 is a cap 68 configured to bolt to the top section 12 to cover the interior space 38 and the piling 36. The cap 68 has attached to it a solar powered grid 70 as a source of power for a detection device 72 that detects the condition of the sleeve 10, such as the level of contaminants, temperature, and the like. The solar panel 70 can also be used to power warning lights, or other electronic equipment, such as transmitters and the like. An impeller 74 is also shown on the cap 68 that is configured to be driven by the wind to pump air into the bladder 20 to maintain the bladder in an inflated condition. It is to be understood that other sources of power may be used, such as batteries, or direct wire to a power source for running an air pump, water pump, and the electronic devices associated with the detection device 72.

Turning next to FIGS. 3A–3E, shown therein is another embodiment of a marine habitat enhancement system 76 that is configured to be anchored to the floor 78 of the body of water 80 as a stand-alone unit. The system includes a sleeve 82 formed of first and second top halves 84, 86 and first and second bottom halves 88, 90 as well as a top panel 92 and a bottom panel 94. Attached to the outside of the sleeve 82 are habitat devices 96 that can be used to support aquaculture or other forms of life. For example, the habitat devices 96 can be bird stations or bird feeders for above-water applications. Within the sleeve 82 is an aquaculture habitat 98 that is shown in more detail in FIG. 3B to consist of a plurality of frayed ropes 100 attached to a frame 102 and configured for mounting within the sleeve 82. A protective mesh netting 104 (shown in FIG. 3E) may be placed around individual ropes 100 or around the entire aquaculture habitat 98.

Beneath the habitat 98 is an optional air pump 106, powered by a battery 108 or a solar panel 110 mounted to the top panel 92. The air pump 106 includes a plurality of blades 112 mounted to a shaft 114 that turns or that permits the blades 112 to turn and circulate fluid, such as air or water, within the system 76. An optional remote camera 116 can also be mounted on the top panel 92 to provide real-time imaging of the status of the system 76. Attached to the outside of the first and second bottom halves 88, 90, or integrally formed therewith, are a plurality of plants 118 growing out of holders 120. Optional openings 122 may be provided to give access to bottom fish, octopus, and the like. The plants 118 and the openings 122 provide shelter for small fish and shade and light. The various plants 118 can be used to conceal the openings 122 to provide shelter for small fish as well as shade. Large rocks may also be formed around the base of the habitat to further encourage the growth of marine life.

The entire sleeve 82 is anchored via a shaft 124 having the bottom panel 94 attached at one end and an anchor 126 attached at the other end. Optionally, an anchor with chains may be used depending on the particular application. To facilitate placements and replacement of the system 76, pickup rings 128 may be used on the top panel 92.

Figure 4A:
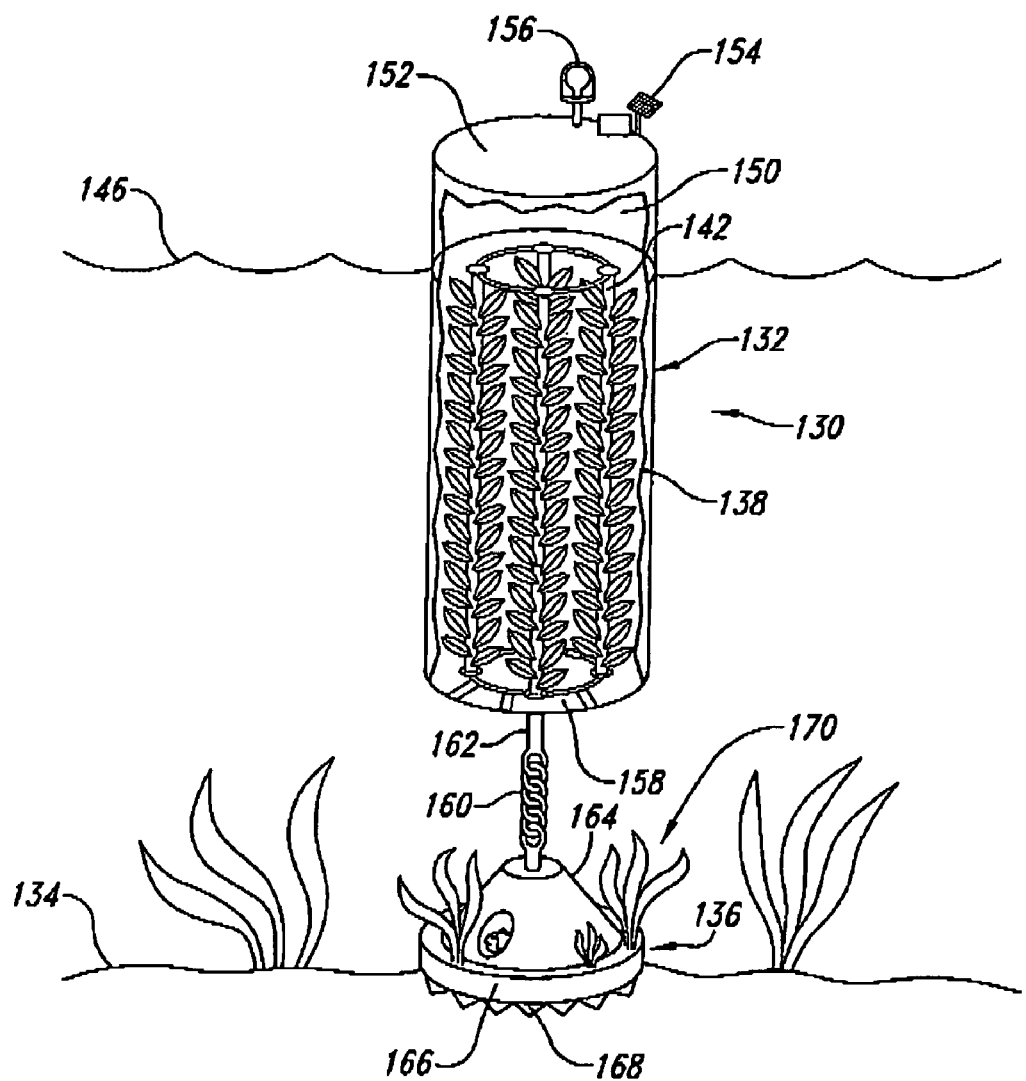
FIGS. 4A–4E illustrate a marine aquaculture enhancement system formed in accordance with the present invention.
Figure 4B:
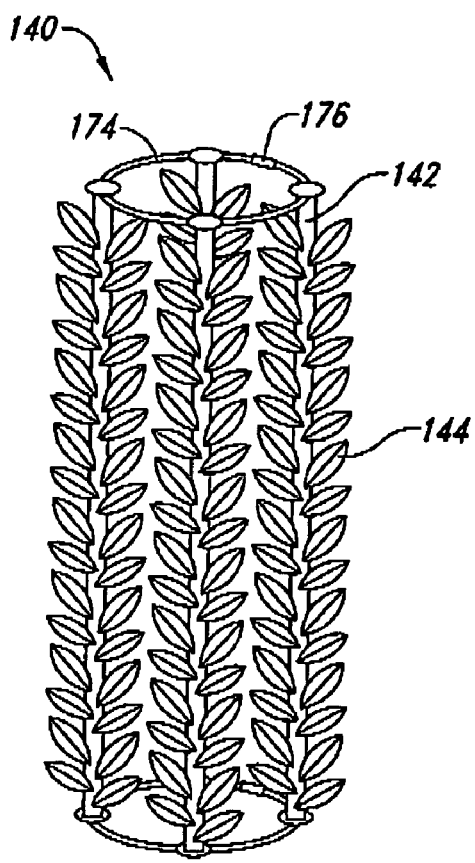
Figure 4C:
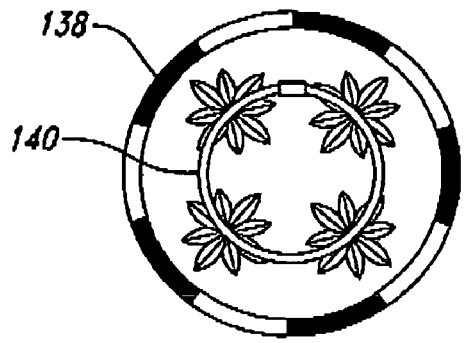
Figure 4D:
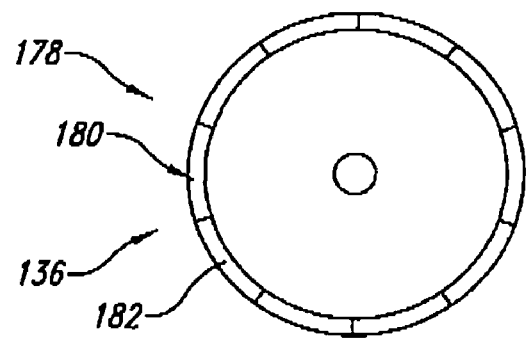
Figure 4E:
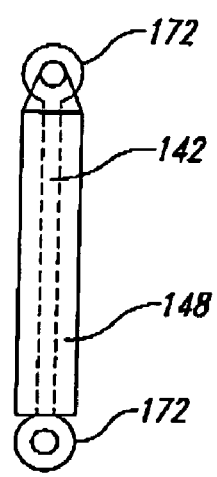

Referring next to FIGS. 4A–4E, shown therein is a stand-alone marine aquaculture habitat system 130 that is on a smaller scale than the system 76 discussed above with respect to FIGS. 3A–3E. In this system 130, a portable habitat 132 is anchored to the floor 134 of the body of water by a weighted aquaculture anchor 136. The portable habitat 132 is formed from a plurality of arcuate panels 138 that are attached to and encircle a frame 140, as shown in FIG. 4C, upon which are mounted a frayed rope or a plurality of frayed ropes 142, as shown in FIGS. 4B and 4E. The ropes 142 may be a polyrope and may have marine life, such as mussels 144, growing thereon before placement in the water, or the mussels 144 can be allowed to grow naturally after placement in the water 146. A protective net 148 can be placed around the rope, as shown in FIG. 4E. An air chamber 150 can be formed within the habitat 132, ideally above the frame 140, to provide buoyancy to the portable habitat 132. Positioned on a top panel 152 are optional sources of power, such as a solar panel 154, a navigation light 156, and other electronic devices can be provided, such as temperature monitors, current flow monitors, nutrient monitors, and the like.

Depending down from a bottom panel 158 is a chain 160 attached to a yolk 162, although it is to be understood that the yolk 162 may extend all the way down to the aquaculture anchor 136 in place of the chain 160. Cables or chains 164 couple the chain 160 to the anchor base 166, which has a rough bottom 168 for holding the system 130 to the floor 134. The anchor base 166 is configured to hold marine life, such as plants 170, to enhance recovery and growth of marine life.

As shown in FIGS. 4B and 4E, the ropes 142 have eyelets 172 to receive a stainless steel cable 174 that forms the frame 140 for the ropes 142. The cable 174 can be attached together using conventional male-female-male threaded fasteners 176, as shown in FIG. 4B.

In one embodiment, the aquaculture anchor 136 shown in FIG. 4D includes a central cement disc or other weighted bottom 178 having a circumscribing habitat 180 that, in this embodiment, are divided into individual compartments 182.

This more simplified system 130 is less expensive and less cumbersome than the system 76 described above with respect to FIGS. 3A–3E. This enhances portability and is more useful in shallower waters.

As will be readily appreciated from the foregoing, the sleeve of the present invention enhances the environment by providing a habitat for mussels, oysters, barnacles, and other marine life by removing toxins in the marine environment while using bioremediation on the inside thereof to reduce toxic and non-toxic chemicals that harm the environment and kills or entraps contaminated marine life. The sleeve protects healthy marine life by keeping toxic chemicals such as P.A.H., PCB's, insecticides, pesticides, creosote, and other wood treatment chemicals from entering the environment through leaching and otherwise.

Figure 5:
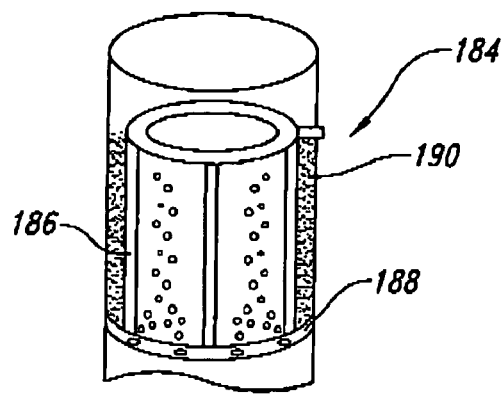
FIG. 5 illustrates an alternative embodiment of a sleeve with air lines in accordance with the present invention.

Referring next to FIGS. 5–8, shown therein are other embodiments of a marine aquaculture enhancement system. In FIG. 5 is shown an improved sleeve 184 having air lines 186 going to the top of a bladder or air seal 188. The bladder or air seal 188 is perforated to release oxygen into the sand 190 inside the sleeve 184. The sand 190 may be layered with rock or gravel for better filtration. The released oxygen or air rises under pressure upward to exhaust holes in the cap (not shown).

Bioremediation material can be injected into the air lines 186 or in separate lines constructed for that purpose. Alternatively the material can be poured in through the top of the sleeve or pre-mixed in with the sand. It is noted that oysters and mussel are excellent for removing "toxins" and they will eventually grow on the piling sleeve.

The sleeve should utilize rubber seals or other sealable material on joints to protect from leaching. The sleeve may be manufactured as a solid piece or with corrugated sides that lock together. Cables, snaps, bolts, interlocks, or other known fastening methods may be used to hold the longitudinally-divided sides together.

Figure 6:
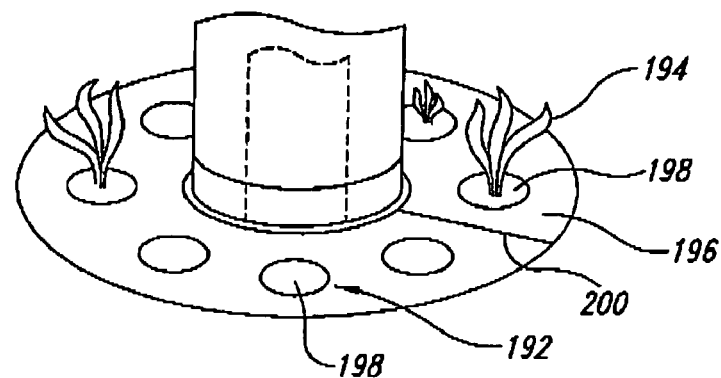
FIG. 6 illustrates a barrier for use with a sleeve of the present invention.

Referring next to FIG. 6, a barrier 192 is shown formed from one-quarter inch or thicker environmentally-friendly material, such as plastic, rubber, or other conformable material that restricts erosion of the sea floor. Underwater plants 194 may be added to the base 196 through cut or pre-cut holes 198. Ideally, the barrier 192 extends a foot or more from the piling. It should be noted that the barrier 192 could be used for land-based applications, such as telephone poles, signs, and the like. The center may be shaped to accommodate square as well as round poles. A cut 200 facilitates installation around existing poles. When used on land, sand, decontamination, absorbent, or like material can be placed between the casing and the piling to prevent contaminants from reaching the soil.

Figure 7:
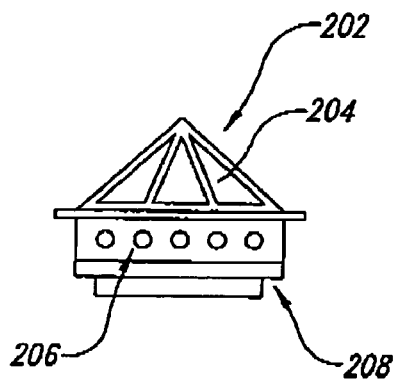
FIG. 7 illustrates a cap for use with a sleeve of the present invention.

FIG. 7 shows an alternative cap 202 for installation on top of a sleeve (not shown). The cap can contain a battery and electronic monitors and sensors. A pump, powered by the wind or solar powered via solar panels 204 may be installed on the top. The panels 204 may function as fan blades to turn a pump or other fan blades may be used. Exhaust holes 206 are used to exhaust air from the interior of the sleeve. The cap bottom 208 can be attached with lag screws on the inside or outside or bolted or tied, or it can be snapped on and off the sleeve.

A rubber gasket may be used with the cap 202 that is removable to add bioremediation materials. A fitting can be used on the cap bottom 208 formed of pipe that is capped with a removable cover. The pipe is perforated lengthwise with a sold top to introduce the bioremediation materials into the sleeve.

Figure 8:
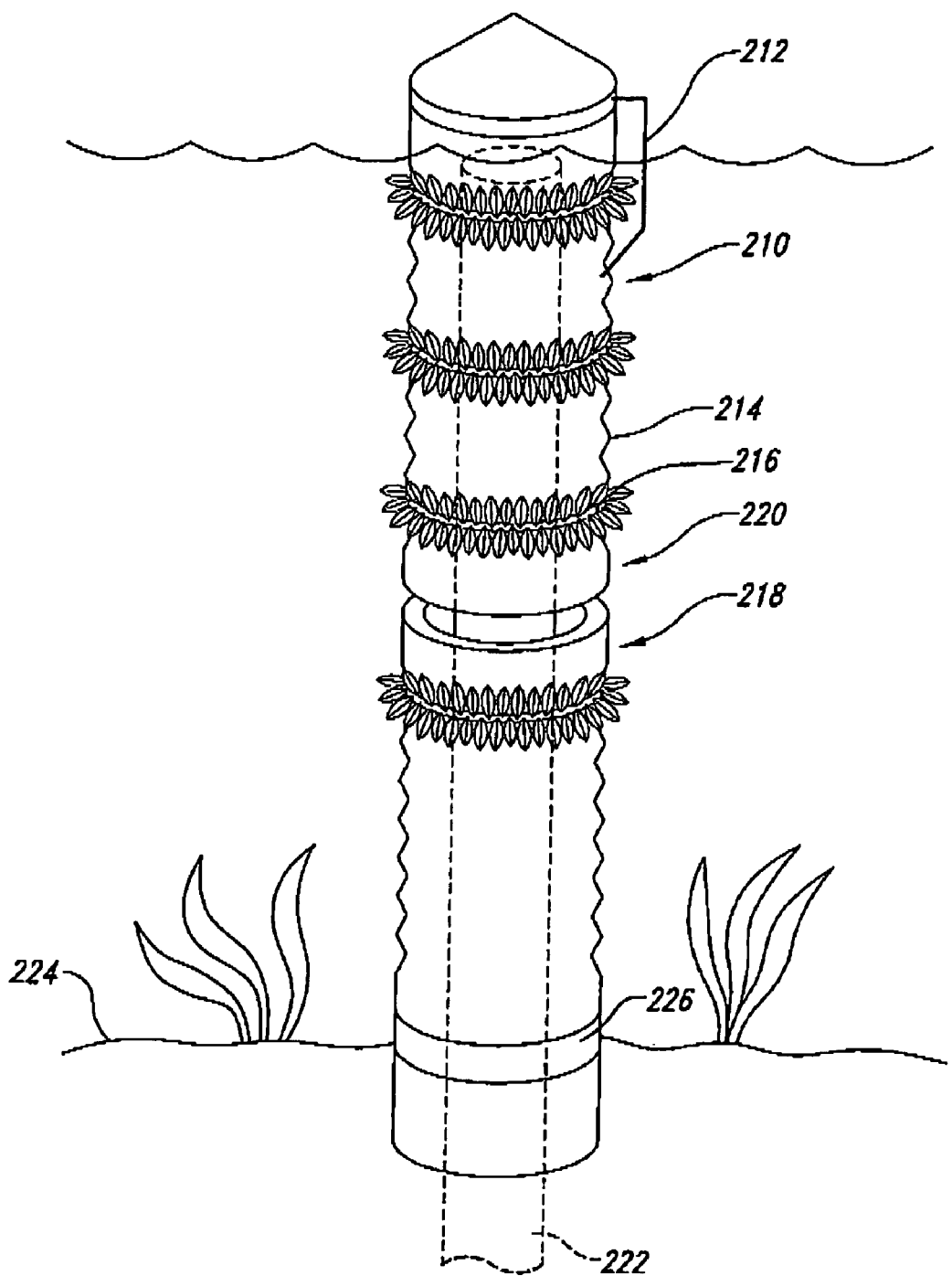
FIG. 8 illustrates a marine aquaculture enhancement system formed in accordance with another embodiment of the invention.

FIG. 8 shows another configuration for a marine aquaculture remediation system 210 showing an air line 212 external to the sleeve 214. Alternatively, solar panels can be used to power a pump for air. In order to use bioremediation, the system 210 must have a supply of air and must be enclosed approximately 120 days. Creosote will be relatively harmless, reduced to approximately 90% after that period of time.

The system 210 includes a seeded rope 216 with mussels grown from aquaculture farms wrapped around with fasteners or tied, reducing the risk of it being torn off. Other marine life, such as oysters, may also be used, depending on the area to be covered. Netting may also be used, which is wrapped around the piling sleeve 214.

Male-female standard fittings 218, 220, respectively, are used to connect the sleeve sections together, as shown in FIG. 8. A gasket and standard hardware is used as appropriate for the application, such as in salt water, fresh water, or on dry land. The sleeve thickness is ideally one-quarter inch or greater, depending on the diameter and height of the piling or post.

The sleeve 214 is driven or installed into a pre-dug area around the piling 222 at least a foot or more below the sea floor 223. A heavy-duty inflatable bladder 226 can be used to prevent leaching downward of toxic substances. Inflation can be by air or water. Ideally, all of the components are manufactured to be interchangeable with one another to facilitate construction and installation and provide more versatility.

Referring next to FIG. 9, shown therein is an independent bottom 224 to be used in conjunction with a sleeve 227 surrounding a piling 228. The bottom 224 may be constructed of plastic, galvanized rubber, or other strong, resilient material that resists salt-water corrosion. Plants 230 can be placed on the bottom 224 or grown on the bottom 224 for phytoremediation. This embodiment of the invention may also be used on land.

In FIG. 10 is shown an illustration of a sleeve 232 having either a ribbed side or a side made of corrugated material to form ribs 234.

FIG. 11 shows a sleeve 236 formed of a bottom half 238 that can be first installed at low tide and then an associated bladder 240 is inflated with water or air or other fluid to seal the sleeve 236 against the piling 242. A valve 244 is used to inflate and deflate the bladder 240.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A marine aquaculture recovery system for use with existing pilings in the earth, comprising:
   a casing sized and shaped to be positioned around a piling with a space formed between the casing and the piling;
   a device for sealing the space between a base of the casing and an exposed surface at a base of the piling to prevent the spread of hazardous materials in the earth in an area around the base of the piling;
   a marine aquacultural device attached to the casing, the device comprising a shelter structured to house marine life and to facilitate growth of marine life at least on the earth in the area around the base of the piling; and
   an independent bottom on the earth around the piling.

2. The system of claim 1, wherein the space formed between the casing and the piling is filled with decontaminate.

3. The device of claim 1, wherein the marine aquacultural device comprises a frayed rope to provide an attachment point for marine life.

4. The system of claim 3, wherein the frayed rope is mounted on a frame attached to the casing.

5. The system of claim 4, wherein marine life is formed on the frayed rope prior to attachment to the casing.

6. The system of claim 1, wherein the casing is removably formed around the piling.

7. The system of claim 6, wherein the casing is formed in sections configured to be assembled together around the piling.

8. The system of claim 6, further comprising a cap configured to cover an exposed top surface of the piling and the space between the casing and the piling.

9. The system of claim 1, further comprising a ring configured to cover the space between a top of the casing and an adjacent surface of the piling to prevent overflow of water and contaminant from the space between the casing and the piling and to deny access to marine life to the space between the casing and piling.

10. The system of claim 1 wherein the independent bottom comprises openings therein to receive plants.

11. The system of claim 1, comprising plants placed on the independent bottom.

12. A recovery system for poles coated with toxic substances and having a portion embedded in the earth, the system comprising:
   a casing sized and shaped to be placed around the pole to form a space therebetween and to be driven into the earth;
   an annular bottom adapted to be placed around the casing and rest on the earth, the annular bottom comprising a housing structured to shelter and support plant and animal life on the earth.

13. The system of claim 12, further comprising a device for sealing the space between a base of the casing and a base of the pole to prevent the spread of toxic substances into the earth.

14. The system of claim 12 wherein the space between the casing and the post is filled with decontaminant or absorbent.

15. The system of claim 12, wherein the housing comprises an independent bottom on the earth around the piling.

16. The system of claim 15 wherein the independent bottom comprises openings therein to receive plants.

17. The system of claim 15, comprising plants placed on the independent bottom.

18. A marine aquaculture recovery system for use with existing pilings, comprising:
   a casing sized and shaped to be formed around a piling with a space formed between the casing and the piling;
   a device for sealing the space between a base of the casing and an exposed surface at a base of the piling to prevent the spread of hazardous materials in an area around the base of the piling; and
   a marine aquacultural device attached to the casing and configured to facilitate growth of marine life in at least the area around the base of the piling, the marine aquacultural device comprising a frayed rope to provide an attachment point for marine life.

19. A marine aquaculture recovery system for use with existing pilings, comprising:
   a casing sized and shaped to be formed around a piling with a space formed between the casing and the piling;
   a device for sealing the space between a base of the casing and an exposed surface at a base of the piling to prevent the spread of hazardous materials in an area around the base of the piling; and
   a marine aquacultural device attached to the casing and configured to facilitate growth of marine life in at least the area around the base of the piling, the marine aquacultural device comprising a frayed rope to provide an attachment point for marine life, the frayed rope mounted on a frame attached to the casing.

20. A marine aquaculture recovery system for use with existing pilings, comprising:
   a casing sized and shaped to be formed around a piling with a space formed between the casing and the piling;
   a device for sealing the space between a base of the casing and an exposed surface at a base of the piling to prevent the spread of hazardous materials in an area around the base of the piling; and
   a marine aquacultural device attached to the casing and configured to facilitate growth of marine life in at least the area around the base of the piling, the marine aquacultural device comprising a frayed rope to provide an attachment point for marine life, the frayed rope having marine life formed thereon prior to attachment to the casing.

* * * * *